United States Patent [19]

Misawa

[11] Patent Number: 5,197,558
[45] Date of Patent: Mar. 30, 1993

[54] STAIR-CLIMBING WHEELCHAIR CARRIER

[75] Inventor: Rintaro Misawa, Saitama, Japan

[73] Assignee: Sunwa Sharyo Manufacturing Co., Ltd., Japan

[21] Appl. No.: 737,864

[22] Filed: Jul. 30, 1991

[30] Foreign Application Priority Data

Oct. 18, 1990 [JP] Japan .................. 2-280049

[51] Int. Cl.$^5$ .................. B62B 5/02; A61G 5/06
[52] U.S. Cl. .................. 180/8.2; 180/9.22; 280/5.22
[58] Field of Search .......... 180/8.2, 8.7, 9.22, 180/270; 280/5.22, 5.3, 166

[56] References Cited

U.S. PATENT DOCUMENTS 3,529,688  9/1970  Bruce ................. 280/5.22 X
3,883,843  5/1975  Telmet et al. .......... 180/270 X
4,627,508 12/1986  Auer .................. 180/8.2 X
4,771,839  9/1988  Misawa ................ 180/8.2

FOREIGN PATENT DOCUMENTS 2-3985  1/1990  Japan .

Primary Examiner—Margaret A. Focarino
Assistant Examiner—C. Mattix
Attorney, Agent, or Firm—Nikaido, Marmelstein, Murray & Oram

[57] ABSTRACT

A stair-climbing wheelchair carrier, comprising a carrier portion comprising a pair of endless belt crawlers, and a handle rotatably mounted on the carrier portion. A guide body is provided to mount a wheelchair and secured to the handle so as to be rotated together with the handle. An electric screw jack is provided between the carrier portion and the guide body for holding the guide body at a desired position.

4 Claims, 5 Drawing Sheets

STAIR-CLIMBING WHEELCHAIR CARRIER

BACKGROUND OF THE INVENTION

The present invention relates to a stair-climbing wheelchair carrier on which a wheelchair with a disabled passenger seated therein is mounted for the transportation of the disabled to go up and down stairs as well as along the ground such as a concourse of a station.

Japanese Utility Model Publication 2-3985 the application of which was filed by the same applicant as the present one discloses a stair-climbing wheelchair carrier that incorporates a wheelchair carrier portion having a pair of crawlers each of which is provided between a driving wheel and an idling wheel with a span extending over at least two steps of the staircase and a motor for driving the crawlers. The wheelchair carrier further incorporates a handle pivotally mounted on the wheelchair carrier for holding a wheelchair, and a pair of wheels, each of which can be lowered from the crawler for carrying the wheelchair on the ground.

However, in the above conventional wheelchair carrier, it is troublesome to change the stair-climbing wheelchair carrier from the condition for climbing stairs to the condition for ground running, and the construction for the change is complicated. The angular position of the wheelchair with respect to the carrier can not be adjusted. Consequently, the wheelchair when held in the carrier could be held at an incline, with the disabled being seated on the chair also at an incline during ascending or descending of the stairs. Therefore the disabled person on the wheelchair may feel uneasy.

SUMMARY OF THE INVENTION

An object of the present invention is to provide a stair-climbing wheelchair carrier in which the angle of the wheelchair with respect to the carrier can be adjusted, and can thereby eliminate above-described disadvantages.

According to the present invention, there is provided a stair-climbing wheelchair carrier having a carrier portion comprising a frame, a pair of endless belt crawlers and a driving motor. Each of the endless belt crawlers has a span extending over two steps and an oblique overhang portion at one end of the frame which has a height higher than the conventional height of the top of a stair step. A handle is rotatably mounted on the frame of the carrier portion.

The carrier comprises a guide body provided to mount wheels of a wheelchair and secured to the handle so as to be pivoted together with the handle, and a jack provided between the frame and the guide body for pivoting the guide body and the handle and for holding the guide body at a desired position.

In one aspect of the invention, the guide body comprises a pair of wheel holding plates, a pair of ramp plates, and a housing provided on the underside of each wheel holding plate for housing the ramp plate. The jack is an electric screw jack.

The guide body has a caster on the underside thereof at a front portion and a pair of wheels at a rear portion so as to enable the carrier to move on the ground.

The other objects and features of this invention will become understood from the following description with reference to the accompanying drawings.

DETAILED DESCRIPTION OF THE PREFERRED EMBODIMENT

Figure 1:
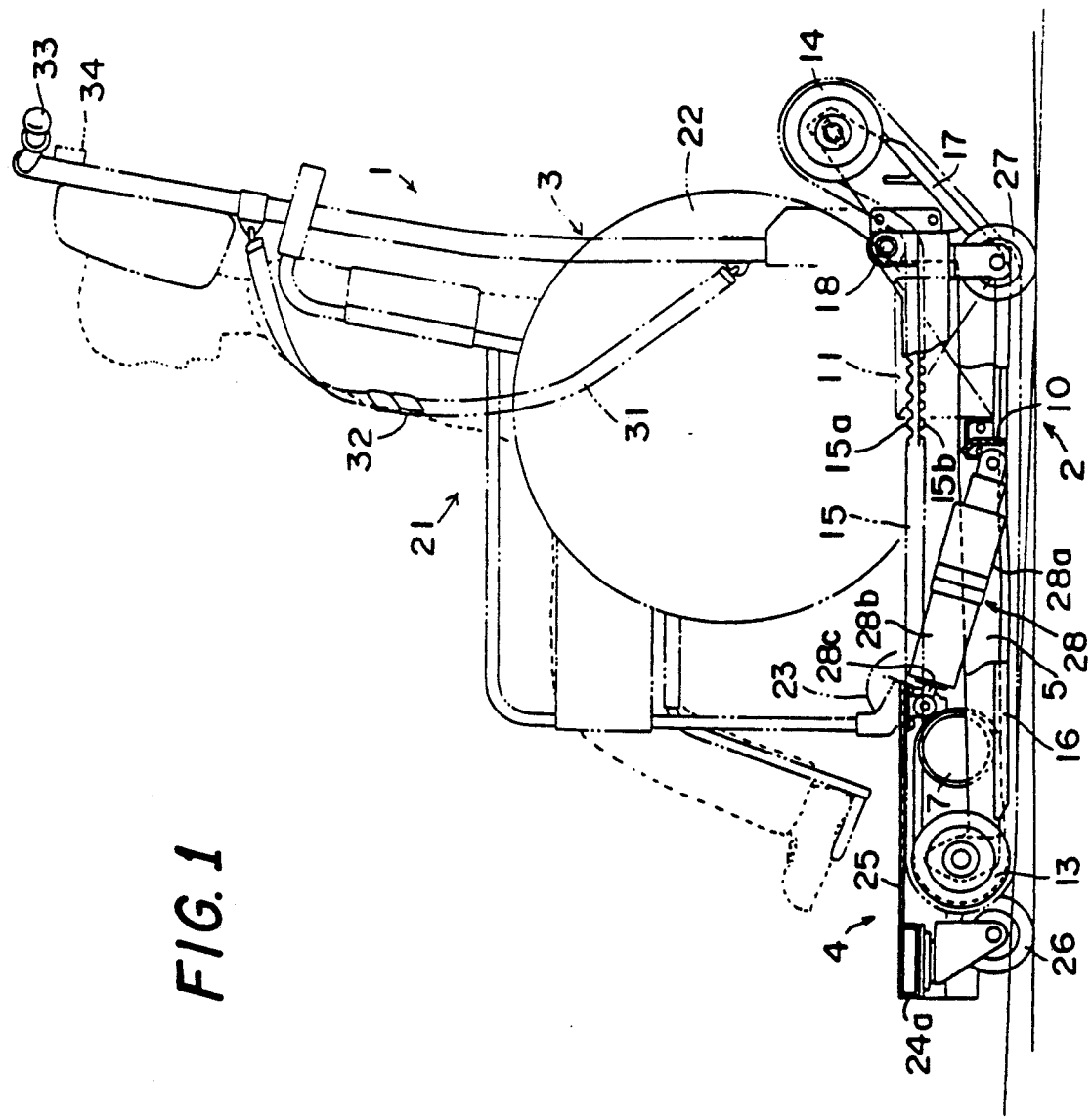
FIG. 1 is a side view showing a main part of a stair-climbing wheelchair carrier in accordance with the present invention.
Figure 2:
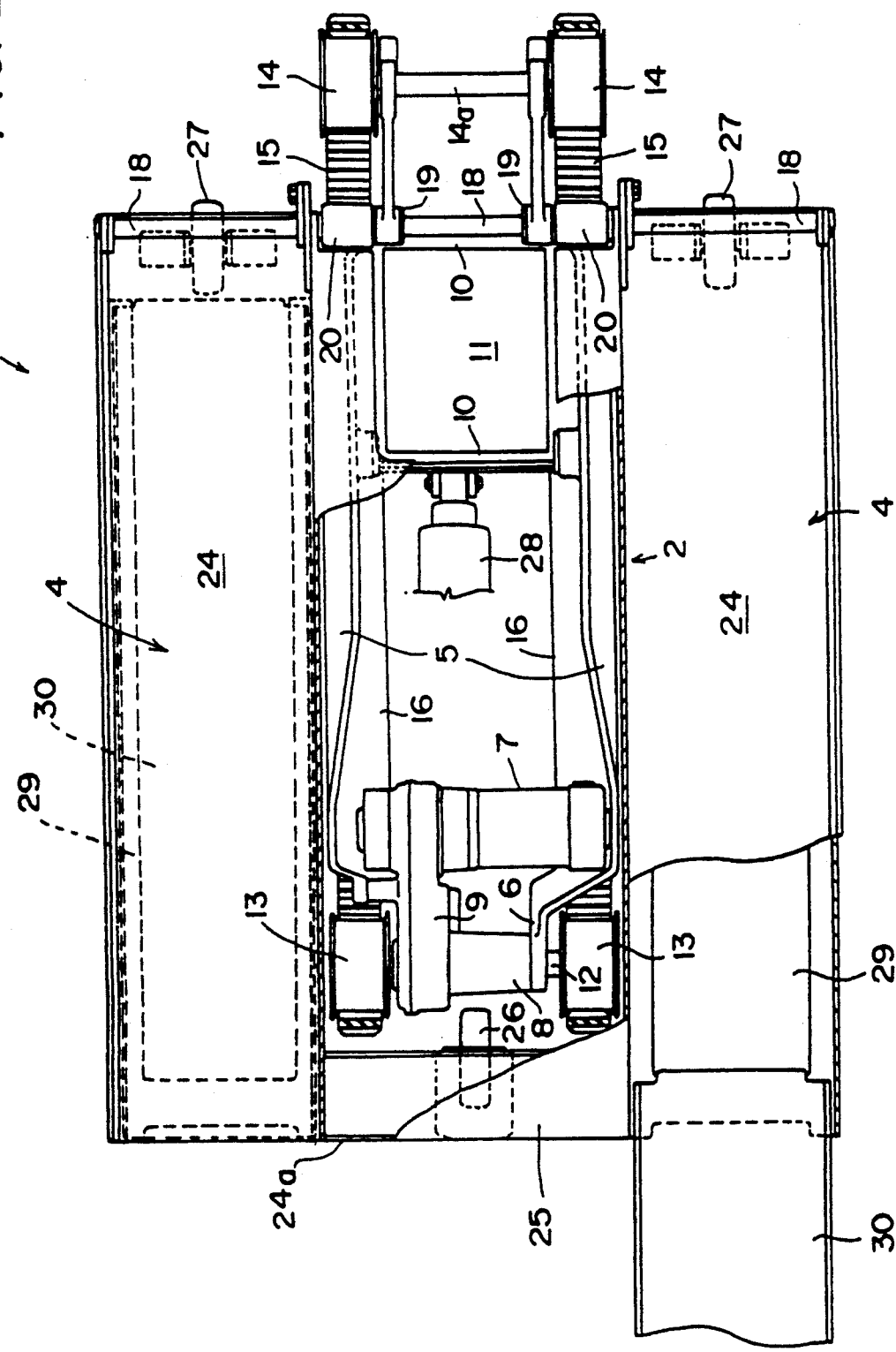
FIG. 2 is a plan view partly showing the wheelchair carrier.

Referring to FIGS. 1 and 2, a stair-climbing wheelchair carrier 1 of the present invention comprises a wheelchair carrier portion 2, a handle 3, and a guide body 4 integrally connected to the handle 3.

The wheelchair carrier portion 2 has a pair of rail-frames 5 of die-cast aluminum die-casting, the rear ends of which are curved upwards like a sleigh. These frames 5 are disposed parallel on each side of the carrier portion 2. Flanges 6 formed on the ends of the frames 5 are connected to each other through a reduction gear case 9 which combines a driving motor 7 and a reduction gear 8. A plurality of connecting members 10 are bridged over the frames 5 at intermediate positions along the length of the frame 5 to constitute the frame body of the wheelchair carrier. A battery 11 as a power source of the driving motor 7 is supported on the connecting members 10.

A pair of driving wheels 13 are secured to a driving shaft 12 which is connected to the reduction gear 8, and a pair of idlers 14 are mounted on a shaft 14a laterally provided on the rear and upper end of overhang portions of the frames 5. A belt crawler 15 is engaged with guide grooves of the driving wheel 13, a grounding guide portion 16 provided on the frame 5, a lower guide groove of an overhang 17, and guide grooves of the idling wheel 14. A pair of belt crawlers 15 are parallel with each other, and the distance between the belt crawler 15 is smaller than the distance between a pair of wheels of a wheelchair 21.

Considering typical road and staircase conditions, the belt crawlers 15 are made of elastic synthetic rubber to absorb shock as well as to protect the floor plate or staircase. The belt crawler 15 is provided with lugs 15a disposed at a predetermined interval to properly engage with the steps of the staircase. The inner surface of the belt crawler 15 is provided with lugs 15b engageable with driving teeth, preventing the belt crawler from slipping around the driving wheels 13. The belt crawler 15 has a span extending over at least two steps of the staircase.

The guide body 4 comprises a cover plate 25 provided for covering the wheelchair carrier portion 2 except the battery 11, a pair of wheel holding plates 24 secured to the opposite sides of the cover plate 25 for holding the wheels 22 and casters 23 of the wheelchair 21. The holding plates 24 have a base plate and a pair of upright side plates U-shaped section. Further, the plates 24 is formed to have a wide enough to guide and support the wheels 22 and casters 23 of the wheelchair 21 along the guide body 4 when the wheelchair 21 is mounted on the wheelchair carrier 1.

Each holding plate 24 is provided with a hollow housing portion 29 formed on the underside thereof for housing a ramp plate 30 which is used for loading or unloading the wheelchair 21 on the holding plate 24. When the ramp plate 30 is housed in the housing portion 29, the plate 30 is engaged with the housing portion 29 so as to prevent the ramp plate from falling out of the housing portion. The ramp plate 30 is pulled out from the housing portion 29 when in use. At that time the innermost end of the ramp plate 30 is engaged with a stopper of the housing portion 29.

Figure 4:
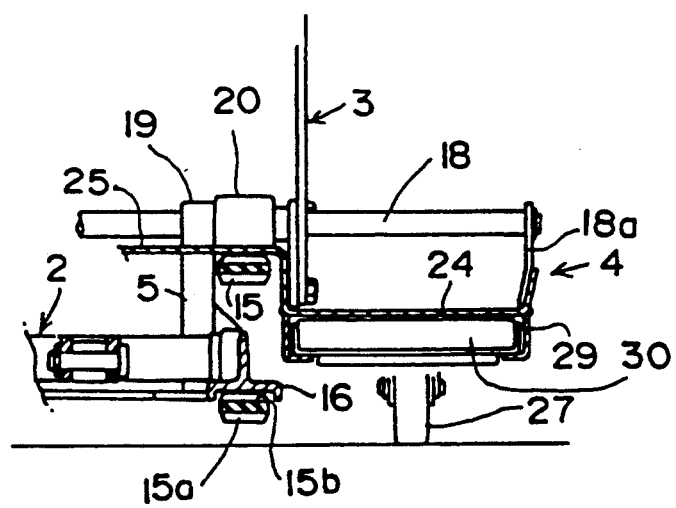
FIG. 4 is a sectional view of a guide body of the wheelchair carrier taken along a line IV—IV of FIG. 3.

A pair of bearing portion 19 are formed on the frames 5 near the overhang 17. A shaft 18 is securely mounted in the bearing portion 19. As shown in FIG. 4, both ends of the shaft 18 are mounted on supporting plates 18a which are secured to the outer side plates of the wheel holding plates 24. A base end of each wheel holding plate 24 is pivotally mounted on the shaft 18. The shaft 18 also serves as a stopper for stopping the wheels 22 when the wheelchair 21 is mounted on the holding plates 24. The shaft 18 has a pair of idlers 20 rotatably mounted on opposite ends thereof. Each idlers 20 engages with the belt crawler 15, so that the upper moving portion of the belt crawler 15 is deflected to a substantially horizontal plane.

The handle 3 is integrally mounted on the holding plate 24 at a rear portion thereof. The handle 3 has a connecting plate 3a secured to an inner side plate of the wheel holding plate 24 and rotatably mounted on the shaft 18. Thus, the handle 3 and the guide body 4 are pivotally mounted on the shaft 18.

A single caster 26 is provided on the underside of the connecting member 24a. A pair of wheels 27 are provided on the underside of the holding plates 24 at rear ends thereof. Both the caster 26 and the wheels 27 are provided to be projected lower than the belt crawlers 15.

Figure 3:
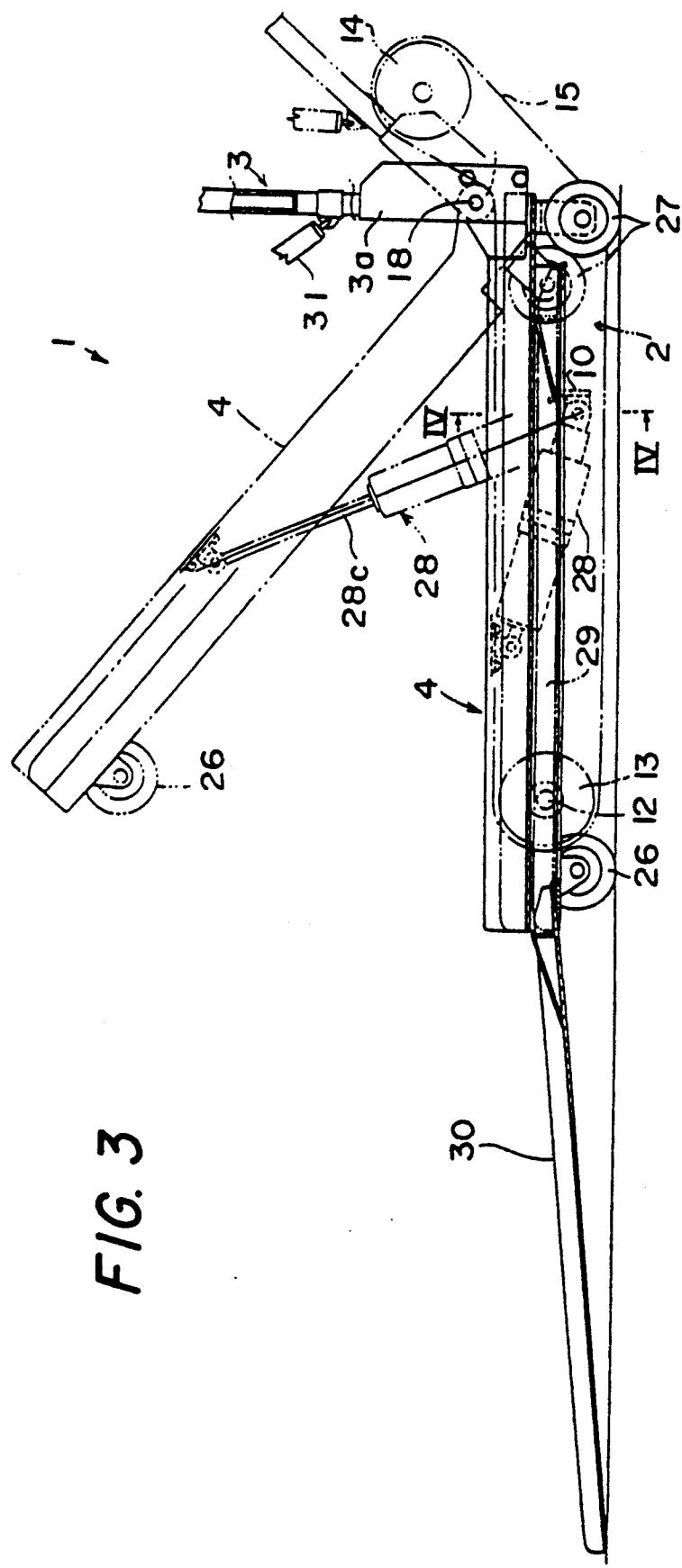
FIG. 3 is a side view of the wheelchair carrier for explaining the operation of the wheelchair carrier.

An electric screw jack 28 is provided on the underside of the cover plate 25 of the guide body 4 for pivoting the guide body 4 together with the handle 3 about the shaft 18. As shown in FIGS. 1 and 3, the electric screw jack 28 comprises a motor 28a, a reduction gear 28b, and a screw rod 28c projected by the motor without rotating. The end of the rod is connected to the cover plate 25, and the base end of the motor 28a is connected to one of the connecting members 10.

When the rod 28c is contracted in the jack 28, the caster 26 and the wheels 27 are grounded. When the rod 28a is extended from the jack, the guide body 4 is pivoted about the shaft 18 so that the caster 26 and the wheels 27 are raised from the ground. Thus, the crawlers 15 are grounded.

The wheelchair 21 is connected to the wheelchair carrier 1 by a seat belt 31 attached to the handle 3 through a buckle 32. An electric circuit connected to the battery 11, the driving motor 7 and the motor 28a is mounted in the buckle 32 for operating the motors 7 and 28a. When the buckle 32 is disengaged, the circuit is adapted to be disconnected so that the motors 7 and 28a cannot operate. Further, a limit switch in the electric circuit is provided on the screw jack 28. The motor 7 cannot operate unless the screw jack 28 is operated to extend the rod 28c.

A switch device 34 is provided near grips 33 of the handle 3 for operating the driving motor 7 and the screw jack 28.

To mount the wheelchair 21 on the carrier 1, the ramp plate 30 is pulled out from housing portion 29. Thereafter, the wheelchair 21 is moved onto the guide plates 25 passing through the ramp plate 30 until the rear wheels 22 about on the shaft 18.

In order to carry the wheelchair 21 with the wheelchair carrier 1 on the ground or to the landing of the stairs, the carrier 1 can be moved by wheels 27 and the caster 26 by pushing using the handle 3.

Figure 5:
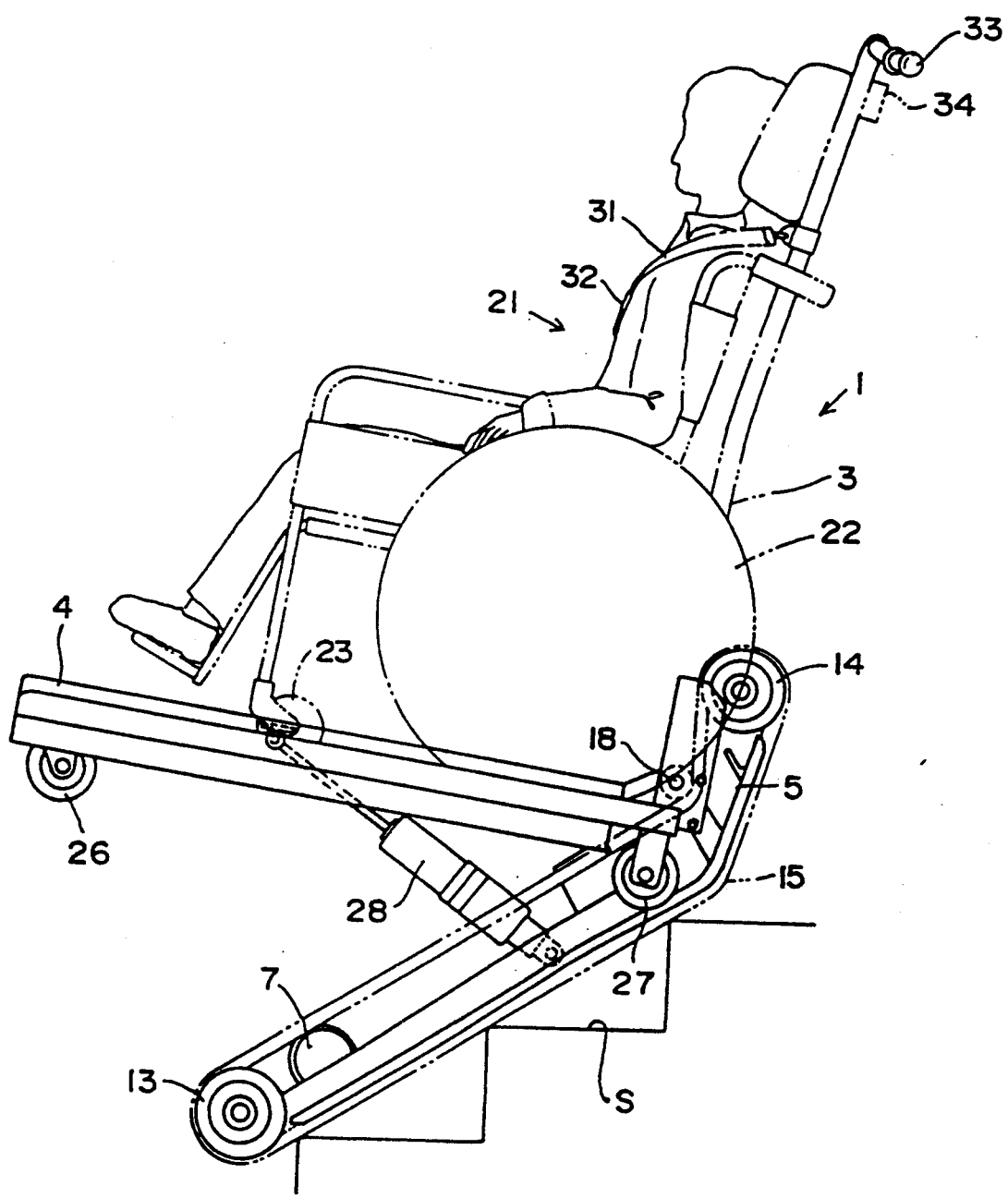
FIG. 5 is an explanatory view showing the stair-climbing operation of the carrier.

When ascending or descending the stairs, the piston rod 28a is extended by operating the switch device 34. Thus, the handle 3 and the guide body 4 are pivoted about the shaft 18 to the inclined position so that the wheelchair 21 is held in position for ascending or descending the stairs. The angle of the wheelchair can be adjusted by properly operating the switch device 34. Referring to FIG. 5, the belt crawlers 15 contact with the corners of the steps S of the stairs and are driven by the motor 7. Thus, the carrier 1 can go up or down the stairs using the crawlers 15.

In the present invention, unless the wheelchair 21 is secured to the handle 3 by coupling the buckle 32 of the seat belt 31, the circuit to operate the motor 7 and the jack 28 is not closed. Further, if the rod 28a of the jack 28 is not extended, the motor 7 cannot operate. Thus, the safety of the carrier is ensured.

The ground running position of the guide body 4 of the carrier 1 is easily changed to the stair-climbing position by operating the switch device 34.

To unload the wheelchair 21 from the carrier 1, the jack 28 is operated to retract the rod 28a so as to lower the guide body 4. This ground the caster 26 and the wheels 27 are grounded. The ramp plates 30 are pulled out from the housings 29 and the wheelchair 21 is released from the handle 31 by disengaging the buckle 32. The wheelchair 21 is removed in the reverse order to the above described manner for mounting the wheelchair.

In accordance with the present invention, the stair-climbing wheelchair carrier is provided with the jack for positioning the carrier to the stair-climbing position. Since the jack holds the wheelchair at any position, the angle of the wheelchair can be adjusted to the horizontal position on the stairs. When the wheelchair is moved on the ground, the carrier is pushed through the handle so that the wheelchair on the carrier can be safely moved on the ground with the caster and the wheels. When ascending or descending stairs, the rod of the jack is extended to raise the guide body so that the caster and the wheels are removed from the ground. Thus, the crawlers can be safely moved up or down the stairs while keeping the wheelchair horizontal.

The ramp plates are housed in the housing portions so that the appearance of the carrier is not aggravated.

Unless the buckle of the seat belt is coupled, power is not applied to the motors. Consequently, any dangerous stair-climbing operation wherein the wheelchair is not properly with the carrier can be prevented.

While the presently preferred embodiment of the present invention has been shown and described, it is to be understood that this disclosure is for the purpose of illustration only, and that various changes and modifications may be made without departing from the scope of the invention as set forth in the appended claims.

What is claimed is:

1. A stair-climbing wheelchair carrier having a carrier portion comprising a frame, a pair of endless belt crawlers and a driving motor, each of the endless belt crawlers having a span extending over two steps and an oblique overhang portion at one end of the frame which has a height higher than a usual height of a step of a stair, a handle rotatably mounted on the frame of the carrier portion, the carrier comprising:
- a guide body provided to mount wheels of a wheelchair and secured to the handle so as to be pivoted together with the handle, said guide body having a caster on the underside thereof at a front portion and a pair of wheels at a rear portion so as to enable the carrier to move on the ground; and
- a jack provided between the frame and the guide body for pivoting the guide body and the handle and for holding the guide body at a desired position.

2. A stair-climbing wheelchair carrier having a carrier portion comprising a frame, a pair of endless belt crawlers and a driving motor, each of the endless belt crawlers having a span extending over two steps and an oblique overhang portion at one end of the frame which has a height higher than a usual height of a step of a stair, a handle rotatably mounted on the frame of the carrier portion, the carrier comprising:
- a guide body provided to mount wheels of a wheelchair and secured to the handle so as to be pivoted together with the handle, said guide body comprising a pair of wheel holding plates, a pair of ramp plates, and a housing provided on the underside of each wheel holding plate for housing the ramp plate;
- a jack provided between the frame and the guide body for pivoting the guide body and the handle and for holding the guide body at a desired position.

3. The stair-climbing wheelchair carrier according to claim 1 wherein the jack is an electric screw jack.

4. The stair-climbing wheelchair carrier according to claim 3 further comprising a seat belt having a buckle for connecting the wheelchair with the handle, and circuit means for allowing the driving motor and the electric screw jack to operate when the buckle is coupled.

* * * * *